United States Patent
Park et al.

(10) Patent No.: US 10,125,258 B2
(45) Date of Patent: Nov. 13, 2018

(54) THERMOPLASTIC RESIN COMPOSITION AND MOLDED PARTS USING THE SAME

(71) Applicant: Lotte Advanced Materials Co., Ltd., Yeosu-si (KR)

(72) Inventors: Jung Woo Park, Uiwang-si (KR); Myung Hun Kim, Uiwang-si (KR); Kee Hae Kwon, Uiwang-si (KR); Chang Min Hong, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 0 days.

(21) Appl. No.: 15/140,630

(22) Filed: Apr. 28, 2016

(65) Prior Publication Data

US 2016/0319128 A1 Nov. 3, 2016

(30) Foreign Application Priority Data

Apr. 30, 2015 (KR) .................. 10-2015-0061951
Apr. 27, 2016 (KR) .................. 10-2016-0051488

(51) Int. Cl.
C08L 69/00 (2006.01)
C08L 55/02 (2006.01)

(52) U.S. Cl.
CPC .................................. *C08L 69/00* (2013.01)

(58) Field of Classification Search
CPC combination set(s) only.
See application file for complete search history.

(56) References Cited

U.S. PATENT DOCUMENTS

| | | | |
|---|---|---|---|
| 4,880,875 A * | 11/1989 | Wassmuth | C08L 51/04 524/504 |
| 6,512,077 B1 | 1/2003 | Miyamoto et al. | |
| 9,133,323 B2 | 9/2015 | Park et al. | |
| 2001/0034420 A1 * | 10/2001 | Honma | C08L 69/00 525/439 |
| 2003/0134948 A1 * | 7/2003 | Jaatinen | C08K 5/103 524/227 |
| 2010/0035064 A1 | 2/2010 | Nam et al. | |
| 2010/0160481 A1 | 6/2010 | Shin et al. | |
| 2013/0267635 A1 * | 10/2013 | Seidel | C08L 55/02 524/117 |

FOREIGN PATENT DOCUMENTS

| | | |
|---|---|---|
| CN | 1346386 A | 4/2002 |
| CN | 101759989 A | 6/2010 |
| CN | 103270113 A | 8/2013 |
| KR | 10-2001-0101879 A | 11/2001 |
| KR | 10-2008-0053537 A | 6/2008 |
| KR | 10-2010-0026702 A | 3/2010 |
| KR | 10-2012-0075053 A | 7/2012 |

OTHER PUBLICATIONS

Office Action in counterpart Chinese Application No. 201610281314.2 dated Jun. 1, 2017, pp. 1-6.

* cited by examiner

*Primary Examiner* — Jeffrey C Mullis
(74) *Attorney, Agent, or Firm* — Additon, Higgins & Pendleton, P.A.

(57) ABSTRACT

A polycarbonate resin composition and a molded article for automotive parts manufactured using the same. The thermoplastic resin composition includes: (A) a polycarbonate resin; (B) a rubber-modified vinyl graft copolymer comprising (B-1) a first rubber-modified vinyl graft copolymer comprising a rubber polymer having an average particle diameter of about 230 nm to about 380 nm and (B-2) a second rubber-modified vinyl graft copolymer comprising a rubber polymer having an average particle diameter of about 60 nm to about 200 nm; (C) an aromatic vinyl-vinyl cyanide copolymer; and (D) a (meth)acrylic copolymer. The thermoplastic resin composition can have excellent properties in terms of heat stability and gloss.

11 Claims, No Drawings

THERMOPLASTIC RESIN COMPOSITION AND MOLDED PARTS USING THE SAME

CROSS-REFERENCE TO RELATED APPLICATION

This application claims priority to and the benefit of Korean Patent Application No. 10-2015-0061951, filed on Apr. 30, 2015, and No. 10-2016-0051488, filed on Apr. 27, 2016 in the Korean Intellectual Property Office, the entire disclosure of which is incorporated herein by reference.

FIELD

The present invention relates to a thermoplastic resin composition and a molded article manufactured using the same.

BACKGROUND

Polycarbonate is an engineering plastic widely used in the plastics industry.

Polycarbonate can have a glass transition temperature (Tg) of about 150° C. by virtue of a bulky molecular structure, such as bisphenol A, and thus can exhibit high thermal resistance. Also, a carbonyl group in a carbonate group has high rotational mobility and thus can impart flexibility and stiffness to polycarbonate. In addition, polycarbonate is an amorphous polymer having superior transparency and can exhibit excellent properties in terms of impact resistance and compatibility with other resins.

However, polycarbonate has poor flowability and is often used in the form of alloys with various resins to complement workability and post-processability.

Among such alloys, a polycarbonate/acrylonitrile-butadiene-styrene copolymer (PC/ABS) alloy can have excellent properties in terms of durability, thermal resistance, and impact resistance and is used in various fields such as electrical/electronic products, optical devices, automotive components, construction materials, medical instruments, food containers, and other real-world materials. For example, PC/ABS alloys can be easily used as a large molded article emitting lots of heat, such as automotive components, computer housings, or office equipment.

Some molded articles may be subjected to deposition after injection molding, as needed. In deposition on plastic materials, a deposition process is generally performed after surface coating of an injection molded product.

Recently, direct deposition methods have been developed which omit surface coating of a molded article prior to deposition to overcome environmental problems. In such methods, surface properties of an injection molded article become major factors influencing deposition.

Conventionally, a molding method such as rapid heat cycle molding (RHCM) has been used to adjust gloss of a surface of an injection molded article. However, this method has a limitation in productivity due to long injection molding time. In another method, the amount of a rubber polymer in a thermoplastic resin composition can be reduced to obtain a molded article with a high gloss surface. This method, however, has a problem of deterioration in properties such as impact strength due to decreased rubber amount.

Therefore, there is a need for a thermoplastic resin composition which has excellent gloss and heat stability while maintaining inherent properties of the resin composition.

SUMMARY OF THE INVENTION

Exemplary embodiments provide a thermoplastic resin composition which can exhibit improved heat stability and gloss while having excellent properties such as impact resistance, transparency, and colorability, and a molded article for automotive parts manufactured using the same.

In exemplary embodiments, a thermoplastic resin composition includes: (A) a polycarbonate resin; (B) a rubber-modified vinyl graft copolymer including (B-1) a first rubber-modified vinyl graft copolymer including a rubber polymer having an average particle diameter of about 230 nm to about 380 nm and (B-2) a second rubber-modified vinyl graft copolymer including a rubber polymer having an average particle diameter of about 60 nm to about 200 nm; (C) an aromatic vinyl-vinyl cyanide copolymer; and (D) a (meth)acrylic copolymer.

The thermoplastic resin composition may include: about 65 wt % to about 85 wt % of the polycarbonate resin (A); about 2 wt % to about 15 wt % of the rubber-modified vinyl graft copolymer (B); about 2 wt % to about 25 wt % of the aromatic vinyl-vinyl cyanide copolymer (C); and about 5 wt % to about 30 wt % of the (meth)acrylic copolymer (D), each based on the total weight of the polycarbonate resin (A), the rubber-modified vinyl graft copolymer (B), the aromatic vinyl-vinyl cyanide copolymer (C), and the (meth)acrylic copolymer (D).

The rubber-modified vinyl graft copolymer (B) may include the first rubber-modified vinyl graft copolymer (B-1) and the second rubber-modified vinyl graft copolymer (B-2) in a weight ratio of about 1:0.25 to about 1:4.

The rubber-modified vinyl graft copolymer (B) may include an acrylonitrile-butadiene-styrene graft copolymer (g-ABS).

The aromatic vinyl-vinyl cyanide copolymer (C) may include a styrene-acrylonitrile copolymer.

The (meth)acrylic copolymer (D) may include a methyl methacrylate copolymer.

The (meth)acrylic copolymer (D) may include a methyl methacrylate-styrene-acrylonitrile copolymer (MSAN).

A weight ratio of the aromatic vinyl-vinyl cyanide copolymer (C) to the methyl methacrylate-styrene-acrylonitrile copolymer (MSAN) may range from about 1:0.25 to about 1:4.

The (meth)acrylic copolymer (D) may include a methyl methacrylate-acrylonitrile-butadiene-styrene graft copolymer (g-MABS).

In exemplary embodiments, a molded article for automotive parts is manufactured using the thermoplastic resin composition as set forth above.

The molded article may have a volatile gas generation amount of about 900 ppm or less, as measured by a process in which 5 g of pellets prepared from the thermoplastic resin composition are placed in a petri dish, and the dish is covered with a glass panel and heated on a hot plate at 250° C. for 3 hours, followed by measuring the weight increase of the glass panel.

The molded article may have a gloss of about 95 GU to about 110 GU as measured at a reflection angle of 20° and a gloss of about 90 GU to about 105 GU as measured at a reflection angle of 60° in accordance with ASTM D523.

When the molded article contains a black colorant, the molded article may have a brightness (L) of less than about 29, as measured by the Commission Internationale de l'Eclairage (CIE) Lab color system.

DETAILED DESCRIPTION

The above and other aspects, features, and advantages of the present invention will become apparent from the detailed description of the following embodiments. It should be understood that the present invention is not limited to the following embodiments and may be embodied in different ways, and that the embodiments are provided for complete disclosure and a thorough understanding of the present invention by those skilled in the art. The scope of the present invention is defined only by the claims.

Unless otherwise defined herein, all terms including technical or scientific terms used herein have the same meanings as commonly understood by those skilled in the art to which the present invention pertains. It will be further understood that terms, such as those defined in commonly used dictionaries, should not be interpreted in an idealized or overly formal sense unless expressly so defined herein.

Hereinafter, embodiments of the present invention will be described in detail.

In accordance with exemplary embodiments, a thermoplastic resin composition includes: (A) a polycarbonate resin; (B) a rubber-modified vinyl graft copolymer; (C) an aromatic vinyl-vinyl cyanide copolymer; and (D) a (meth) acrylic copolymer.

Now, each component of the thermoplastic resin composition according to the present invention will be described in more detail.

(A) Polycarbonate Resin

The polycarbonate resin (A) may be a polyester containing a carbonate bond and may include any polycarbonate resin available in the field of resin compositions without limitation.

For example, the polycarbonate resin may be prepared by reacting a compound selected from among phosgene, halogen acid ester, carbonic acid ester, and a combination thereof with one or more diphenols represented by Formula 1:

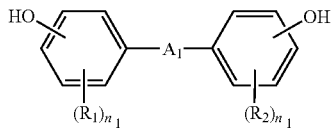

wherein $A_1$ is a single bond, a substituted or unsubstituted linear or branched $C_1$ to $C_{30}$ alkylene group, a substituted or unsubstituted $C_2$ to $C_5$ alkenylene group, a substituted or unsubstituted $C_2$ to $C_5$ alkylidene group, a substituted or unsubstituted linear or branched $C_1$ to $C_{30}$ haloalkylene group, a substituted or unsubstituted $C_5$ to $C_6$ cycloalkylene group, a substituted or unsubstituted $C_5$ to $C_6$ cycloalkenylene group, a substituted or unsubstituted $C_5$ to Cm cycloalkylidene group, a substituted or unsubstituted $C_6$ to $C_{30}$ arylene group, a substituted or unsubstituted linear or branched $C_1$ to $C_{20}$ alkoxylene group, a halogen acid ester group, a carbonic acid ester group, —CO—, —S—, and —SO$_2$—; $R_1$ and $R_2$ are the same or different and are each independently a substituted or unsubstituted $C_1$ to $C_{30}$ alkyl group or a substituted or unsubstituted $C_6$ to $C_{30}$ aryl group; and $n_1$ and $n_2$ are the same or different and are each independently an integer from 0 to 4. As used herein, the term "substituted" means that a hydrogen atom in a functional group is substituted with a halogen group, a $C_1$ to $C_{30}$ alkyl group, a $C_1$ to $C_{30}$ haloalkyl group, a $C_6$ to $C_{30}$ aryl group, and/or a $C_1$ to $C_{20}$ alkoxy group.

At least two diphenols represented by Formula 1 may be combined to form a repeat unit of the polycarbonate resin.

Examples of the diphenols may include without limitation hydroquinone, resorcinol, 4,4'-dihydroxyphenyl, 2,2-bis-(4-hydroxyphenyl)-propane (also referred to as "bisphenol A"), 2,4-bis-(4-hydroxyphenyl)-2-methylbutane, bis(4-hydroxyphenyl)-methane, 1,1-bis-(4-hydroxyphenyl)-cyclohexane, 2,2-bis-(3-chloro-4-hydroxyphenyl)-propane, 2,2-bis-(3-methyl-4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, bis(4-hydroxyphenyl)-sulfoxide, bis(4-hydroxyphenyl)-ketone, bis(4-hydroxyphenyl)-ether, and the like, and combinations thereof. In exemplary embodiments, the diphenol may include 2,2-bis-(4-hydroxyphenyl)-propane, 2,2-bis-(3-methyl-4-hydroxyphenyl)-propane, 2,2-bis-(3,5-dimethyl-4-hydroxyphenyl)-propane, 2,2-bis-(3,5-dichloro-4-hydroxyphenyl)-propane, and/or 1,1-bis-(4-hydroxyphenyl)-cyclohexane, for example, the diphenol may include 2,2-bis-(4-hydroxyphenyl)-propane.

The polycarbonate resin may include a copolymer or a mixture of copolymers prepared from at least two different diphenols.

In addition, the polycarbonate resin may include a linear polycarbonate resin, a branched polycarbonate resin, and/or a polyester carbonate copolymer resin.

Examples of the linear polycarbonate resin may include a bisphenol A polycarbonate resin. Examples of the branched polycarbonate resin may include a resin prepared by reacting a polyfunctional aromatic compound such as trimellitic anhydride and trimellitic acid with one or more diphenols and carbonates. The polyester carbonate copolymer resin may be prepared by reacting a bifunctional carboxylic acid with one or more diphenols and carbonates, wherein the carbonates may be a diaryl carbonate such as diphenyl carbonate and/or ethylene carbonate.

The polycarbonate resin has a weight average molecular weight of about 10,000 g/mol to about 100,000 g/mol, for example about 14,000 g/mol to about 40,000 g/mol. Within this range of weight average molecular weight, the polycarbonate resin composition can have excellent impact resistance and flowability. Further, in order to satisfy desired flowability, the polycarbonate resin may be a mixture of at least two polycarbonate resins having different weight average molecular weights.

The thermoplastic resin composition can include the polycarbonate resin (A) in an amount of about 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, or 85 wt % based on the total weight (100 wt %) of the polycarbonate resin (A), the rubber-modified vinyl graft copolymer (B), the aromatic vinyl-vinyl cyanide copolymer (C), and the (meth)acrylic copolymer (D). In addition, the polycarbonate resin (A) may be present in an amount of from about any of the foregoing amounts to about any other of the foregoing amounts. For example, the polycarbonate resin (A) may be present in an amount of about 65 wt % to about 85 wt %, and as another example about 70 wt % to about 80 wt %, based on the total weight (100 wt %) of the polycarbonate resin (A), the rubber-modified vinyl graft copolymer (B), the aromatic vinyl-vinyl cyanide copolymer (C), and the (meth)acrylic copolymer (D). Within this range, a molded article manufactured using the resin composition can exhibit excellent properties in terms of appearance and mechanical strength.

(B) Rubber-Modified Vinyl Graft Copolymer

The rubber-modified vinyl graft copolymer (B) may have a core-shell structure which includes a core formed of a rubber polymer and a shell formed by grafting a vinyl monomer graft-copolymerizable with the rubber polymer around the core.

The rubber-modified vinyl graft copolymer may include two rubber-modified vinyl graft copolymers, the rubber polymers of which have different average particle diameters.

For convenience, the two rubber-modified vinyl graft copolymers will be referred to as a "first rubber-modified vinyl graft copolymer" (B-1) and a "second rubber-modified vinyl graft copolymer" (B-2), respectively.

Although the particle diameter may be represented as an average size of a group through quantification using a measurement method, a general representation of the particle diameter may include a mode diameter representing a maximum value of a distribution, a median diameter corresponding to a median value of an integral distribution curve, various average diameters (number average, length average, area average, mass average, volume average diameters, and the like), and the like. Unless otherwise stated, the particle diameter as used herein refers to D50 (a diameter at a distribution rate of 50%) which is a number average particle diameter.

The rubber-modified vinyl graft copolymer (B) may be prepared by copolymerizing an aromatic vinyl monomer graft-copolymerizable with a rubber polymer with a monomer copolymerizable with the aromatic vinyl monomer.

In the first rubber-modified vinyl graft copolymer, the rubber polymer may have an average particle diameter of about 230 nm to about 380 nm, for example about 250 nm to about 350 nm.

The first rubber-modified vinyl graft copolymer may include an acrylonitrile-butadiene-styrene graft copolymer (g-ABS). For example, the first rubber-modified vinyl graft copolymer may be prepared by grafting styrene and acrylonitrile to a polybutadiene rubber polymer core to form a shell. Here, grafting may be performed through an emulsion process, a suspension process, and the like.

The acrylonitrile-butadiene-styrene graft copolymer may include about 10 wt % to about 60 wt % of the polybutadiene rubber polymer, about 20 wt % to about 80 wt % of styrene, and about 5 wt % to about 45 wt % of acrylonitrile, each based on the total weight (100 wt %) of the acrylonitrile-butadiene-styrene graft copolymer, wherein the styrene and the acrylonitrile form a repeat unit of an acrylonitrile-styrene copolymer.

In some embodiments, the first acrylonitrile-butadiene-styrene graft copolymer can include the butadiene rubber polymer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 wt %. Further, according to some embodiments of the present invention, the butadiene rubber polymer can be present in an amount of from about any of the foregoing amounts to about any other of the foregoing amounts.

In some embodiments, the first acrylonitrile-butadiene-styrene graft copolymer can include styrene in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments of the present invention, styrene can be present in an amount of from about any of the foregoing amounts to about any other of the foregoing amounts.

In some embodiments, the first acrylonitrile-butadiene-styrene graft copolymer can include acrylonitrile in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, or 45 wt %. Further, according to some embodiments of the present invention, acrylonitrile can be present in an amount of from about any of the foregoing amounts to about any other of the foregoing amounts.

In the second rubber-modified vinyl graft copolymer, the rubber polymer may have an average particle diameter of about 60 nm to about 200 nm, for example about 80 nm to about 180 nm.

The second rubber-modified vinyl graft copolymer may include an acrylonitrile-butadiene-styrene graft copolymer (g-ABS), and a preparation method thereof is the same as described above.

The rubber-modified vinyl graft copolymer may include the first rubber-modified vinyl graft copolymer and the second rubber-modified vinyl graft copolymer in a weight ratio of about 1:0.25, 1:0.3, 1:0.4, 1:0.5, 1:0.6, 1:0.7, 1:0.8, 1:0.9, 1:1.0, 1:1.1, 1:1.2, 1:1.3, 1:1.4, 1:1.5, 1:1.6, 1:1.7, 1:1.8, 1:1.9, 1:2.0, 1:2.1, 1:2.2, 1:2.3, 1:2.4, 1:2.5, 1:2.6, 1:2.7, 1:2.8, 1:2.9, 1:3.0, 1:3.1, 1:3.2, 1:3.3, 1:3.4, 1:3.5, 1:3.6, 1:3.7, 1:3.8, 1:3.9, or 1:4.0. In addition, the rubber-modified vinyl graft copolymer may have the first rubber-modified vinyl graft copolymer and the second rubber-modified vinyl graft copolymer in a weight ratio of greater than or equal to one of the above numerical values and less than or equal to one of the above numerical values.

For example, the rubber-modified vinyl graft copolymer may include the first rubber-modified vinyl graft copolymer and the second rubber-modified vinyl graft copolymer in a weight ratio of about 1:0.25 to about 1:4, and as another example about 1:0.3 to about 1:3.

Within this range of weight ratio of the first rubber-modified vinyl graft copolymer to the second rubber-modified vinyl graft copolymer, an article manufactured using the resin composition by injection molding can exhibit excellent properties in terms of surface gloss and heat stability.

The thermoplastic resin composition can include the rubber-modified vinyl graft copolymer in an amount of about 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, or 15 wt % based on the total weight (100 wt %) of the polycarbonate resin, the rubber-modified vinyl graft copolymer, the aromatic vinyl-vinyl cyanide copolymer, and the (meth)acrylic copolymer. In addition, the rubber-modified vinyl graft copolymer may be present in an amount of from about any of the foregoing amounts to about any other of the foregoing amounts. For example, the rubber-modified vinyl graft copolymer may be present in an amount of about 2 wt % to about 15 wt %, and as another example about 3 wt % to about 12 wt %, based on the total weight (100 wt %) of the polycarbonate resin, the rubber-modified vinyl graft copolymer, the aromatic vinyl-vinyl cyanide copolymer, and the (meth)acrylic copolymer.

Within this range of amount of the rubber-modified vinyl graft copolymer, the resin composition can exhibit excellent compatibility between the polycarbonate resin and the rubber-modified vinyl graft copolymer.

(C) Aromatic Vinyl-Vinyl Cyanide Copolymer

The aromatic vinyl-vinyl cyanide copolymer (C) may have a weight average molecular weight of about 70,000 g/mol to about 400,000 g/mol, for example, about 80,000 g/mol to about 200,000 g/mol.

In exemplary embodiments, the aromatic vinyl-vinyl cyanide copolymer (C) may include a styrene-acrylonitrile copolymer.

The aromatic vinyl-vinyl cyanide copolymer may be formed by copolymerization of about 60 wt % to about 80 wt %, for example about 70 wt % to about 80 wt %, of an aromatic vinyl compound with about 20 wt % to about 40 wt %, for example about 20 wt % to about 30 wt %, of a vinyl cyanide compound.

In some embodiments, the aromatic vinyl-vinyl cyanide copolymer can include the aromatic vinyl compound in an amount of about 60, 61, 62, 63, 64, 65, 66, 67, 68, 69, 70, 71, 72, 73, 74, 75, 76, 77, 78, 79, or 80 wt %. Further, according to some embodiments of the present invention, the aromatic vinyl compound can be present in an amount of from about any of the foregoing amounts to about any other of the foregoing amounts.

In some embodiments, the aromatic vinyl-vinyl cyanide copolymer can include the vinyl cyanide compound in an amount of about 20, 21, 22, 23, 24, 25, 26, 27, 28, 29, 30, 31, 32, 33, 34, 35, 36, 37, 38, 39, or 40 wt %. Further, according to some embodiments of the present invention, the vinyl cyanide compound can be present in an amount of from about any of the foregoing amounts to about any other of the foregoing amounts.

When each monomer is included in an amount in the above range, the thermoplastic resin composition can exhibit improved impact resistance, and an article manufactured using the resin composition by injection molding can have considerably improved appearance.

The thermoplastic resin composition can include the aromatic vinyl-vinyl cyanide copolymer in an amount of about 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, or 25 wt % based on the total weight (100 wt %) of the polycarbonate resin, the rubber-modified vinyl graft copolymer, the aromatic vinyl-vinyl cyanide copolymer, and the (meth)acrylic copolymer. In addition, the aromatic vinyl-vinyl cyanide copolymer may be present in an amount of from about any of the foregoing amounts to about any other of the foregoing amounts. For example, the aromatic vinyl-vinyl cyanide copolymer may be present in an amount of about 2 wt % to about 25 wt %, and as another example about 2 wt % to about 20 wt %, based on the total weight of the polycarbonate resin, the rubber-modified vinyl graft copolymer, the aromatic vinyl-vinyl cyanide copolymer, and the (meth) acrylic copolymer.

Within this range of amount of the aromatic vinyl-vinyl cyanide copolymer, the resin composition can exhibit excellent properties in terms of compatibility between the polycarbonate resin and the rubber-modified vinyl graft copolymer and paintability.

(D) (Meth)Acrylic Copolymer

The (meth)acrylic copolymer may be a copolymer including a (meth)acrylic compound as a copolymerization monomer and serves to improve gloss of an article manufactured using the thermoplastic resin composition according to the present invention. For example, the (meth)acrylic copolymer (D) may include a methyl methacrylate copolymer.

By way of example, the (meth)acrylic copolymer may include a methyl methacrylate-styrene-acrylonitrile copolymer (MSAN).

In the thermoplastic resin composition according to the present invention, a weight ratio of the aromatic vinyl-vinyl cyanide copolymer to the methyl methacrylate-styrene-acrylonitrile copolymer may be about 1:0.25, 1:0.3, 1:0.4, 1:0.5, 1:0.6, 1:0.7, 1:0.8, 1:0.9, 1:1.0, 1:1.1, 1:1.2, 1:1.3, 1:1.4, 1:1.5, 1:1.6, 1:1.7, 1:1.8, 1:1.9, 1:2.0, 1:2.1, 1:2.2, 1:2.3, 1:2.4, 1:2.5, 1:2.6, 1:2.7, 1:2.8, 1:2.9, 1:3.0, 1:3.1, 1:3.2, 1:3.3, 1:3.4, 1:3.5, 1:3.6, 1:3.7, 1:3.8, 1:3.9, or 1:4.0. In addition, in the thermoplastic resin composition, a weight ratio of the aromatic vinyl-vinyl cyanide copolymer to the methyl methacrylate-styrene-acrylonitrile copolymer may range from one of the above numerical values to one of the above numerical values. For example, in the thermoplastic resin composition, a weight ratio of the aromatic vinyl-vinyl cyanide copolymer to the methyl methacrylate-styrene-acrylonitrile copolymer may range from about 1:0.25 to about 1:4.

Further, the (meth)acrylic copolymer may include a methyl methacrylate-acrylonitrile-butadiene-styrene graft copolymer (g-MABS).

The thermoplastic resin composition can include the (meth)acrylic copolymer in an amount of about 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, or 30 wt % based on the total weight (100 wt %) of the polycarbonate resin, the rubber-modified vinyl graft copolymer, the aromatic vinyl-vinyl cyanide copolymer, and the (meth)acrylic copolymer. In addition, the (meth)acrylic copolymer may be present in an amount of from about any of the foregoing amounts to about any other of the foregoing amounts. For example, the (meth)acrylic copolymer may be present in an amount of about 5 wt % to about 30 wt %, and as another example about 7 wt % to about 25 wt %, based on the total weight (100 wt %) of the polycarbonate resin, the rubber-modified vinyl graft copolymer, the aromatic vinyl-vinyl cyanide copolymer, and the (meth)acrylic copolymer.

The thermoplastic resin composition may further include one or more additives, as needed. Examples of the additives may include without limitation flame retardants, lubricants, plasticizers, heat stabilizers, antioxidants, photostabilizers, colorants, and the like. These additives may be used singly or as a mixture thereof depending upon desired properties of a final molded article.

The flame retardants serve to reduce inflammability and may include at least one of a phosphate compound, a phosphite compound, a phosphonate compound, polysiloxane, a phosphazene compound, a phosphinate compound, and/or a melamine compound, without being limited thereto.

The lubricants serve to lubricate a surface of a metal contacting the polycarbonate resin composition during processing, molding, and/or extrusion to facilitate flow and/or migration of the resin composition and may include any typical lubricants known in the art.

The plasticizers serve to improve flexibility, processability, and/or expansibility of the polycarbonate resin composition and may include any typical plasticizers known in the art.

The heat stabilizers serve to suppress pyrolysis of the polycarbonate resin composition in kneading and/or molding at high temperature and may include any typical heat stabilizers known in the art.

The antioxidants serve to suppress and/or block chemical reaction between the polycarbonate resin composition and oxygen, thereby preventing loss of inherent properties of the resin composition due to decomposition of the resin composition, and may include at least one of phenol-type, phosphite-type, thioether-type and/or amine-type antioxidants, without being limited thereto.

The photostabilizers serve to suppress and/or block discoloration and/or loss of mechanical properties of the polycarbonate resin composition due to decomposition caused by UV light and may include at least one of hindered phenol-type photostabilizers, benzophenone-type photostabilizers, and/or benzotriazole-type photostabilizers, without being limited thereto.

The colorants may include any typical pigments and/or dyes.

The additives may be present in an amount of about 0.1 part by weight to about 15 parts by weight based on about 100 parts by weight of the thermoplastic resin composition.

The thermoplastic resin composition according to the present invention may be prepared by any typical known method used in preparation of a resin composition. For example, the above components and, optionally, one or more other additives, can be mixed, followed by melt extrusion in an extruder, thereby preparing a resin composition in the form of pellets.

In accordance with other exemplary embodiments, a molded article may be manufactured using the thermoplastic resin composition as set forth above. The thermoplastic resin composition can exhibit excellent heat stability and gloss. Thus, deposition on an article manufactured using the thermoplastic resin composition by injection molding can be effectively achieved without using a coating process.

The molded article can have excellent gloss. The molded article may have a gloss of about 95 GU to about 110 GU, for example about 98 GU to about 110 GU, as measured at a reflection angle of 20° in accordance with ASTM D523, and may have a gloss of about 90 GU to about 105 GU, for example about 95 GU to about 105 GU, as measured at a reflection angle of 60°.

In addition, the molded article can have excellent colorability. The molded article may have a brightness (L) of less than about 29, for example less than about 28, as measured on a specimen containing a black colorant by the Commission Internationale de l'Eclairage (CIE) Lab color system. The brightness (L) is measured using a spectrophotometer (CM-3600D, Konica Minolta Co., Ltd.) in specular component included (SCI) mode. Here, a higher brightness value indicates brighter color gamut, which means lower colorability with reference to black.

Further, the molded article can have excellent heat stability and thus can reduce generation of volatile gases at high temperature. As used herein, heat stability may be measured by a fogging test.

Specifically, in the fogging test, 5 g of pellets prepared from the thermoplastic resin composition are placed in a petri dish, which in turn is covered with a glass panel and heated on a hot plate at 250° C. for 3 hours, followed by measuring the weight of the glass panel, thereby finding a generation amount of volatile gases at high temperature.

The molded article according to the present invention may have a volatile gas generation amount of about 900 ppm or less, for example about 450 ppm or less, as measured by the fogging test.

In addition, haze properties of the molded article can be evaluated by measuring a haze value of the glass plate left for 3 hours after the fogging test is conducted, as described above. A lower haze value indicates a lower amount of volatile gas deposited on the glass panel and thus better haze properties.

The molded article according to the present invention may have a difference between haze values of a glass panel before and after a fogging test of about 3% to about 18%. This means that the molded article has excellent haze properties.

The molded article according to the present invention can have excellent properties in terms of gloss, colorability, and heat stability and thus can be unlimitedly used as a molded article requiring excellent gloss, colorability, and heat stability. For example, the molded article can be useful as a bezel for automotive lamps or a lens, which is a molded article requiring a deposition process after injection molding.

Example

Next, results of a test for demonstrating advantageous effects of the thermoplastic resin composition according to the invention will be described.

Details of components used in the following Examples and Comparative Examples are as follows:

(a) Polycarbonate Resin

A polycarbonate resin having a weight average molecular weight of 20,000 g/mol (Samsung SDI) is used.

(b) Rubber-Modified Vinyl Graft Copolymer (b-1) An acrylonitrile-butadiene-styrene graft copolymer composed of 45 wt % of a polybutadiene rubber polymer core and 55 wt % of a shell (Samsung SDI) is used. Here, the shell is a styrene-acrylonitrile copolymer composed of 71 wt % of styrene and 29 wt % of acrylonitrile, and the polybutadiene rubber polymer has an average particle diameter of about 300 nm.

(b-2) An acrylonitrile-butadiene-styrene graft copolymer composed of 45 wt % of a polybutadiene rubber polymer core and 55 wt % of a shell (Samsung SDI) is used. Here, the shell is a styrene-acrylonitrile copolymer composed of 71 wt % of styrene and 29 wt % of acrylonitrile, and the polybutadiene rubber polymer has an average particle diameter of about 130 nm.

(c) Aromatic Vinyl-Vinyl Cyanide Copolymer

An aromatic vinyl-vinyl cyanide copolymer including 24 wt % of acrylonitrile and 76 wt % of styrene and having a weight average molecular weight of about 150,000 g/mol (Samsung SDI) is used.

(d) (Meth)Acrylic Copolymer (d-1) A methyl methacrylate-styrene-acrylonitrile copolymer including 5 wt % of acrylonitrile, 20 wt % of styrene, and 75 wt % of methyl methacrylate and having a weight average molecular weight of about 100,000 g/mol (Samsung SDI) is used.

(d-2) A methyl methacrylate-acrylonitrile-butadiene-styrene graft copolymer composed of 55 wt % of a polybutadiene rubber polymer core and 45 wt % of a shell (Samsung SDI) is used. Here, the shell is a methyl methacrylate-styrene-acrylonitrile copolymer composed of 20 wt % of styrene, 10 wt % of acrylonitrile, and 70 wt % of methyl methacrylate, and the polybutadiene rubber polymer has an average particle diameter of about 240 nm.

Thermoplastic resin compositions of Examples and Comparative Examples are prepared according to amount ratios as listed in Table 1. The amount of each component is represented in % by weight (wt %) based on the total weight of the thermoplastic resin composition.

TABLE 1

|  |  | (a) | (b-1) | (b-2) | (c) | (d-1) | (d-2) |
|---|---|---|---|---|---|---|---|
| Example | 1 | 70 | 2.5 | 7.5 | 10 | 10 | — |
|  | 2 | 70 | 5 | 5 | 10 | 10 | — |
|  | 3 | 70 | 7.5 | 2.5 | 10 | 10 | — |
|  | 4 | 70 | 5 | — | 16 | 4 | 5 |
|  | 5 | 70 | 5 | — | 10 | 10 | 5 |
|  | 6 | 70 | 5 | — | 4 | 16 | 5 |
|  | 7 | 70 | — | 5 | 10 | 10 | 5 |

TABLE 1-continued

|  |  | (a) | (b-1) | (b-2) | (c) | (d-1) | (d-2) |
|---|---|---|---|---|---|---|---|
| Comparative | 1 | 70 | 5 | — | 20 | — | 5 |
| Example | 2 | 70 | 5 | — | — | 20 | 5 |
|  | 3 | 70 | 10 | — | 20 | — | — |
|  | 4 | 70 | — | — | 20 | — | 10 |
|  | 5 | 70 | 10 | — | 10 | 10 | — |
|  | 6 | 70 | — | 10 | 10 | 10 | — |
|  | 7 | 70 | — | — | 10 | 10 | 10 |

100 parts by weight of the components listed in Table 1 are dry-mixed with 1 part by weight of carbon black (Hi-black 50L, Orion Engineered Carbons Co., Ltd.) and continuously introduced to a twin-screw type extruder (L/D=29, φ=45 mm) in a consistent amount, followed by melting/kneading, thereby preparing pellets. Here, a barrel temperature is set to 250° C. Thereafter, the pelletized polycarbonate resin composition is dried at about 80° C. for about 2 hours, followed by injection molding using a 6 oz. injection machine at a cylinder temperature of about 260° C. and a mold temperature of about 60° C., thereby preparing a specimen for property evaluation.

The thermoplastic resin compositions prepared in the Examples and Comparative Examples are evaluated as to impact resistance, heat stability, gloss, haze properties, and colorability. An evaluation method for each evaluation item is as follows, and results are shown in Table 2.

1) Impact Resistance: Izod Impact Strength

Izod impact strength is measured on ¼" thick notched Izod specimens prepared from the polycarbonate resin compositions of the Examples and Comparative Examples at 23° C. in accordance with ASTM D256.

2) Heat Stability: Fogging Test 5 g of pellets prepared from the thermoplastic resin compositions of the Examples and Comparative Examples are placed in a petri dish, which in turn is covered with a glass panel and heated on a hot plate at 250° C. for 3 hours, followed by measuring the weight of the glass panel after 3 hours, thereby finding a generation amount of volatile gases.

3) Gloss

Gloss is measured on each of specimens prepared from the polycarbonate resin compositions of the Examples and Comparative Examples and having a size of 9 cm×5 cm×0.2 cm at a reflection angle of 20° and 60° in accordance with ASTM D523.

4) Haze Properties: Haze 5 g of pellets prepared from the thermoplastic resin compositions of Examples and Comparative Examples are placed in a petri dish, which in turn is covered with a glass panel and heated on a hot plate at 250° C. for 3 hours, followed by measuring a haze value of the glass panel after 3 hours, thereby comparing the degree of haze generation caused by volatile gases deposited on the glass plate. Haze is measured using a haze meter (NDH5000, Nippon Denshoku Industries).

5) Colorability: Brightness (L)

Brightness (L) is measured on a specimen having a size of 9 cm×5 cm×0.2 cm using a spectrophotometer (CM-3600D, Konica Minolta Co., Ltd.) in specular component included (SCI) mode.

TABLE 2

|  |  | Izod impact strength (kJ/m2) | Fogging test (ppm) | Gloss (20°, GU) | Gloss (60°, GU) | Haze (%) | Brightness |
|---|---|---|---|---|---|---|---|
| Example | 1 | 24 | 510 | 104 | 102 | 2.6 | 25.3 |
|  | 2 | 28 | 500 | 110 | 105 | 2.5 | 25.0 |
|  | 3 | 29 | 730 | 99 | 98 | 5.0 | 27.7 |
|  | 4 | 25 | 650 | 103 | 102 | 6.1 | 27.1 |
|  | 5 | 23 | 680 | 106 | 103 | 7.5 | 26.8 |
|  | 6 | 20 | 700 | 107 | 104 | 8.2 | 26.2 |
|  | 7 | 19 | 680 | 108 | 104 | 6.4 | 25.4 |
| Comparative | 1 | 28 | 1020 | 95 | 91 | 20.7 | 28.8 |
| Example | 2 | 17 | 810 | 101 | 97 | 19.3 | 27.1 |
|  | 3 | 37 | 1050 | 95 | 89 | 32.3 | 28.9 |
|  | 4 | 34 | 990 | 93 | 91 | 28.0 | 29.0 |
|  | 5 | 31 | 840 | 94 | 93 | 26.1 | 30.4 |
|  | 6 | 35 | 850 | 99 | 92 | 24.1 | 28.9 |
|  | 7 | 32 | 915 | 100 | 97 | 21.0 | 27.8 |

From Tables 1 and 2, it is can be seen that the thermoplastic resin compositions of the Examples have excellent properties in terms of impact resistance, heat stability, gloss, haze, and colorability.

Therefore, it can be seen that the kind and amount of each of the components of the thermoplastic resin composition and the range of average particle diameter of the rubber polymer included in the rubber-modified vinyl graft copolymer are factors significantly influencing impact resistance, heat stability, gloss, haze, and colorability of the thermoplastic resin composition according to the present invention.

Although some embodiments have been described above, it should be understood that these embodiments are provided for illustration only and are not to be construed in any way as limiting the present invention, and that various modifications, changes, alterations, and equivalent embodiments can be made by those skilled in the art without departing from the spirit and scope of the invention. Therefore, the scope of the present invention should be defined by the appended claims and equivalents thereof.

What is claimed is:
1. A thermoplastic resin composition comprising:
(A) about 65 wt % to about 85 wt % of a polycarbonate resin;
(B) about 2 wt % to about 15 wt % of a rubber-modified vinyl graft copolymer comprising (B-1) a first rubber-modified vinyl graft copolymer comprising a rubber polymer having a particle diameter D50 of about 230 nm to about 380 nm and (B-2) a second rubber-modified vinyl graft copolymer comprising a rubber polymer having a particle diameter D50 of about 60 nm to about 200 nm, wherein at least one of (B-1) and/or (B-2) comprises an acrylonitrile-butadiene-styrene graft copolymer (g-ABS);

(C) about 2 wt % to about 25 wt % of an aromatic vinyl-vinyl cyanide copolymer; and (D) about 5 wt % to about 30 wt % of a (meth)acrylic copolymer, each based on the total weight of the polycarbonate resin (A), the rubber-modified vinyl graft copolymer (B), the aromatic vinyl-vinyl cyanide copolymer (C), and the (meth)acrylic copolymer (D), wherein a molded article manufactured using the thermoplastic resin composition has a gloss of 104 GU to 110 GU as measured at a reflection angle of 20° and a gloss of 102 GU to 105 GU as measured at a reflection angle of 60° in accordance with ASTM D523.

2. The thermoplastic resin composition according to claim 1, wherein the rubber-modified vinyl graft copolymer (B) comprises the first rubber-modified vinyl graft copolymer (B-1) and the second rubber-modified vinyl graft copolymer (B-2) in a weight ratio of about 1:0.25 to about 1:4.

3. The thermoplastic resin composition according to claim 1, wherein the aromatic vinyl-vinyl cyanide copolymer (C) comprises a styrene-acrylonitrile copolymer.

4. The thermoplastic resin composition according to claim 1, wherein the (meth)acrylic copolymer (D) comprises a methyl methacrylate copolymer.

5. The thermoplastic resin composition according to claim 1, wherein the (meth)acrylic copolymer (D) comprises a methyl methacrylate-styrene-acrylonitrile copolymer (MSAN).

6. The thermoplastic resin composition according to claim 5, wherein a weight ratio of the aromatic vinyl-vinyl cyanide copolymer (C) to the methyl methacrylate-styrene-acrylonitrile copolymer (MSAN) ranges from about 1:0.25 to about 1:4.

7. The thermoplastic resin composition according to claim 1, wherein the (meth)acrylic copolymer (D) comprises a methyl methacrylate-acrylonitrile-butadiene-styrene graft copolymer (g-MABS).

8. A molded article for automotive parts manufactured using the thermoplastic resin composition according to claim 1.

9. The molded article for automotive parts according to claim 8, wherein the molded article includes a black colorant and has a brightness (L) of less than about 29, as measured by the Commission Internationale de l'Eclairage (CIE) Lab color system on a molded article having a size of 9 cm×5 cm×0.2 cm.

10. The thermoplastic resin composition according to claim 1, wherein the second rubber-modified vinyl graft copolymer (B-2) comprises a rubber polymer having a particle diameter D50 of about 60 nm to about 180 nm.

11. The thermoplastic resin composition according to claim 1, wherein a molded article manufactured using the thermoplastic resin composition including a black colorant has a brightness (L) of less than about 29, as measured by the Commission Internationale de l'Eclairage (CIE) Lab color system on a molded article having a size of 9 cm×5 cm×0.2 cm.

* * * * *